(12) United States Patent
Toyoda et al.

(10) Patent No.: US 7,503,437 B2
(45) Date of Patent: Mar. 17, 2009

(54) RADIALLY MOUNTED DISK BRAKE

(75) Inventors: Hidetoshi Toyoda, Saitama-ken (JP);
Shinichi Kuwahara, Saitama-ken (JP);
Masayuki Fujita, Saitama-ken (JP);
Keisuke Nanri, Yamanashi-ken (JP);
Takashi Sano, Yamanashi-ken (JP)

(73) Assignees: Honda Motor Co., Ltd., Tokyo (JP);
Hitachi, Ltd., Tokyo (JP)

( * ) Notice: Subject to any disclaimer, the term of this patent is extended or adjusted under 35 U.S.C. 154(b) by 0 days.

(21) Appl. No.: 10/934,354

(22) Filed: Sep. 7, 2004

(65) Prior Publication Data

US 2005/0051390 A1 Mar. 10, 2005

(30) Foreign Application Priority Data

Sep. 9, 2003 (JP) .............................. 2003-316750

(51) Int. Cl.
*F16D 55/00* (2006.01)
(52) U.S. Cl. .................................................... 188/71.1
(58) Field of Classification Search ............... 188/18 A, 188/70 R, 71.1, 71.3, 71.4, 72.4, 73.1, 73.39, 188/73.44, 73.45, 73.46, 73.47
See application file for complete search history.

(56) References Cited

U.S. PATENT DOCUMENTS 6,336,526 B1 * 1/2002 Chou ........................... 188/26
6,422,354 B1 * 7/2002 Shaw et al. ................. 188/72.8
6,607,057 B2 * 8/2003 Lumpkin et al. ............. 188/26

FOREIGN PATENT DOCUMENTS

| EP | 1 482 198 | | 12/2004 |
| JP | 07-012148 | | 1/1995 |
| JP | 2000-18291 | | 1/2000 |
| JP | 2001-271857 | | 10/2001 |
| JP | 2003-065369 | | 3/2003 |
| JP | 2003194112 A | * | 7/2003 |
| WO | WO 2004/076270 | * | 9/2004 |

* cited by examiner

*Primary Examiner*—Xuan Lan Nguyen
(74) *Attorney, Agent, or Firm*—Wenderoth, Lind & Ponack, L.L.P.

(57) ABSTRACT

A radially mounted disk brake has a caliper body secured to a support member secured to a vehicle body. The caliper body has mounting holes extending in a direction perpendicular to the axis of rotation of a disk rotor. Large-diameter hole portions are formed at the openings of the mounting holes on the side thereof closer to the support member. The large-diameter hole portions are fitted with the side wall surfaces of cylindrical step portions provided on the support member in such a manner that gaps are formed between the bottoms of the large-diameter hole portions and the distal end surfaces of the step portions. The center of the axial length of each mounting hole is positioned radially outward of the disk rotor in the axial direction of the mounting hole with respect to a shortest-distance portion of the caliper body at which the distance between the center of a cylinder bore and the mounting hole is shortest.

11 Claims, 4 Drawing Sheets

RADIALLY MOUNTED DISK BRAKE

BACKGROUND OF THE INVENTION

The present invention relates to a radially mounted disk brake used to brake a vehicle.

A known radially mounted disk brake includes a caliper having a plurality of mounting holes extending in a direction perpendicular to the axis of rotation of a disk rotor. The caliper is secured to a support member fixed to a vehicle body with mounting bolts passed through the mounting holes. In the radially mounted disk brake, when the caliper is secured to the support member on the vehicle body, tightening torque applied to the mounting bolts acts on a part of the caliper. This may cause the part of the caliper to be damaged. For the purpose of preventing such a problem, a conventional radially mounted disk brake adopts a structure in which sleeves are inserted into mounting holes provided in the caliper, and mounting bolts are inserted through the sleeves to secure the caliper to the support member on the vehicle body [see, for example, Japanese Patent Application Unexamined Publication (KOKAI) No. Hei 7-12148].

In the above-described conventional radially mounted disk brake, the flanges of the sleeves are sandwiched between the mutually opposing surfaces of the caliper and the support member on the vehicle body, and the abutting surfaces of the sleeves and the support members are plane surfaces. Therefore, it is likely that braking torque acting on the caliper during braking may cause the abutting surfaces to be relatively displaced in the axial direction of the disk rotor, and, consequently, the caliper may vibrate, causing brake judder.

If the tightening torque applied to the mounting bolts is simply increased to prevent the relative displacement of the abutting surfaces, the increased torque will cause the sleeves and the peripheries of the mounting holes of the caliper to be deformed radially outward of the mounting holes. If the deformation reaches a cylinder bore, the bore may be deformed. The deformation of the cylinder bore deteriorates the sliding performance of a piston sliding in the cylinder bore, resulting in impaired brake feeling.

Regarding the above-described deformation, a maximum amount of deformation occurs in the vicinity of the center of the axial length of a mounting hole. In a case where the center of the axial length of the mounting hole coincides with a thinnest-wall portion between the cylinder bore and the mounting hole, that is, a shortest-distance portion of the caliper at which the distance between the center of the cylinder bore and the mounting hole is shortest, the cylinder bore may be most deformed. Consequently, brake feeling will be further impaired.

SUMMARY OF THE INVENTION

Accordingly, it is an object of the present invention to provide a radially mounted disk brake capable of minimizing the deformation of the cylinder bore due to the tightening torque applied to the mounting bolts.

The present invention is applied to a radially mounted disk brake including a caliper body adapted to be secured to a support member on a vehicle body. The caliper body has a cylinder bore fitted with a piston that presses a friction pad against a disk rotor. The caliper body further has a plurality of mounting holes spaced in the rotational direction of the disk rotor with the cylinder bore interposed therebetween. The mounting holes extend in a direction perpendicular to the axis of rotation of the disk rotor. The caliper body further has abutting surfaces provided around the respective peripheral edges of the mounting holes. The abutting surfaces are adapted to abut against the support member on the vehicle body. The caliper body is secured to the support member on the vehicle body with mounting bolts passed through the mounting holes.

According to one aspect of the present invention, cylindrical step portions are formed on the support member at respective positions corresponding to the mounting holes, and large-diameter hole portions are formed on the caliper body at the respective openings of the mounting holes on the side thereof closer to the support member. The large-diameter hole portions are fitted with the side wall surfaces of the cylindrical step portions of the support member in such a manner that gaps are formed between the bottoms of the large-diameter hole portions and the distal end surfaces of the cylindrical step portions. The gaps are positioned outward of the innermost portion of the cylinder bore in a radial direction of the disk rotor.

According to another aspect of the present invention, the center of the axial length of each of the mounting holes is positioned radially outward of the disk rotor in the axial direction of the mounting hole with respect to a shortest-distance portion of the caliper body at which the distance between the center of the cylinder bore and the mounting hole is shortest.

According to another aspect of the present invention, along the axis of each mounting hole, the position of the abutting surface of the caliper body and the associated bearing surface of the support member comes outward of the innermost portion of the cylinder bore with respect to a radial direction of the disk rotor.

In an arrangement where the large-diameter hole portions are formed at the support member-side openings of the mounting holes of the caliper body, they are fitted with the side wall surfaces of the cylindrical step portions provided on the support member, thereby restricting the movement of the caliper body, i.e. the caliper, during braking. Therefore, it is possible to minimize brake judder due to the movement of the caliper relative to the support member even if the tightening torque applied to the mounting bolts is reduced to a relatively small value. Accordingly, the deformation of the cylinder bore is minimized, and favorable sliding performance of the piston can be obtained. Thus, brake feeling improves. In an arrangement where the large-diameter hole portions have gaps between their bottoms and the distal end surfaces of the cylindrical step portions, the deformation of the caliper body toward the cylinder bore due to the tightening torque applied to the mounting bolts can be absorbed by the gaps. As a result, the deformation of the cylinder bore is further minimized. Accordingly, favorable sliding performance of the piston can be surely obtained. Thus, brake feeling improves surely. In an arrangement where the center of the axial length of each mounting hole of the caliper body, at which deformation occurring outward of the mounting hole due to the tightening torque reaches a maximum, is positioned radially outward of the disk rotor in the axial direction of the mounting hole with respect to a thin-walled shortest-distance portion of the caliper body at which the distance between the center of the cylinder bore and the mounting hole is shortest, the structure reduces the degree of influence on the cylinder bore of the deformation of the caliper body toward the cylinder bore due to the tightening torque. As a result, the deformation of the cylinder bore is further minimized, and favorable sliding performance of the piston can be obtained even more surely. Accordingly, brake feeling improves even more surely.

DETAILED DESCRIPTION OF THE INVENTION

A radially mounted disk brake according to one embodiment of the present invention will be described below with reference to the accompanying drawings.

Figure 1:
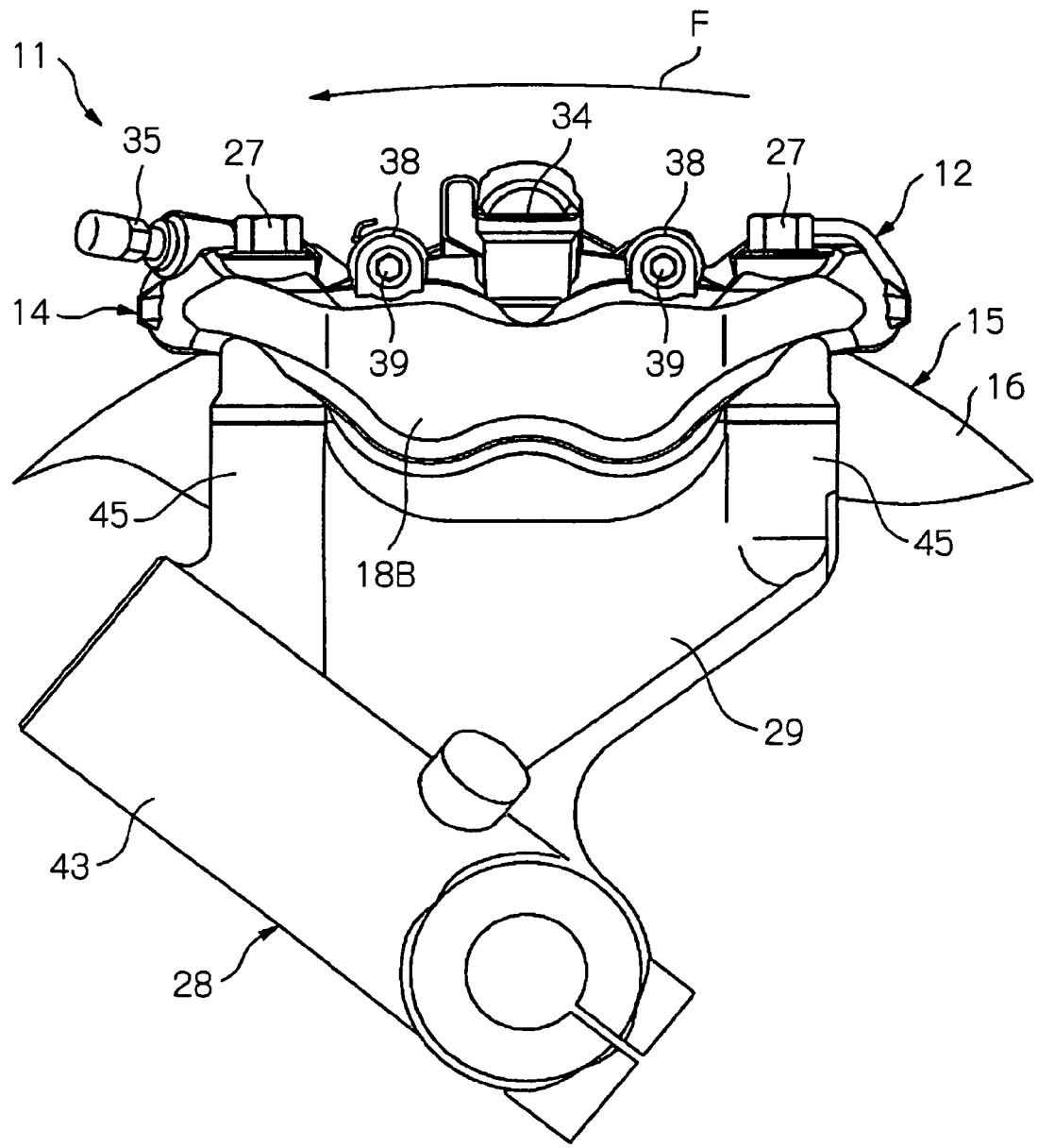
FIG. 1 is a front view of a radially mounted disk brake according to one embodiment of the present invention, showing the way in which it is mounted on a vehicle body.
Figure 2:
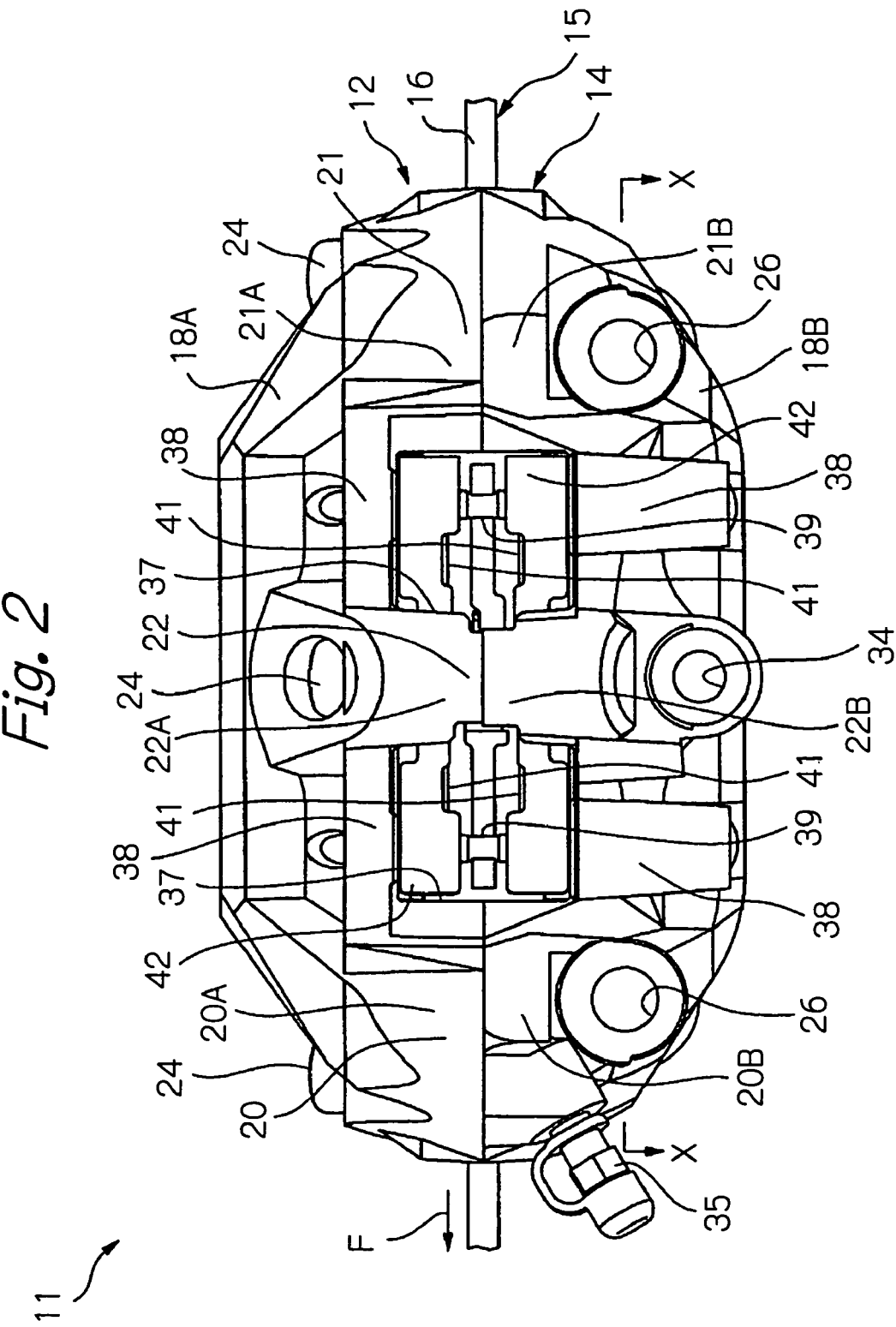
FIG. 2 is a plan view of the radially mounted disk brake according to one embodiment of the present invention.

As shown in FIG. 1, the radially mounted disk brake 11 according to this embodiment is a fixed caliper type disk brake having a caliper 12 fixed to a member on a vehicle body. A caliper body 14 constitutes an essential part of the caliper 12. As shown in FIG. 2, the caliper body 14 has an inner caliper half 18A disposed at the axially inner side (relative to the vehicle) of a disk portion 16 forming braking surfaces of a disk rotor 15 that rotates together with a wheel (not shown) as one unit. The caliper body 14 further has an outer caliper half 18B disposed at the axially outer side of the disk portion 16 (relative to the vehicle). The inner caliper half 18A and the outer caliper half 18B are butt-joined together as one unit. It should be noted that the terms "inner" and "outer" are used herein on the basis of the layout when the disk brake is used in a two-wheel vehicle. The arrow F in the figures indicates the rotational direction of the disk portion 16 when the vehicle is traveling forward. It should be noted that the axial direction of the disk rotor 15 is referred to as "the disk axial direction", and the radial direction of the disk rotor 15 as "the disk radial direction", and further the rotational direction of the disk rotor 15 as "the disk rotational direction".

The inner caliper half 18A has three projecting portions 20A, 21A and 22A at both ends and center thereof in the disk rotational direction. The projecting portions 20A, 21A and 22A project toward the disk portion 16. The outer caliper half 18B also has three projecting portions 20B, 21B and 22B at both ends and center thereof in the disk rotational direction. The projecting portions 20B, 21B and 22B project toward the disk portion 16. The corresponding projecting portions 20A and 20B, 21A and 21B, and 22A and 22B are butted against each other, and in this state, the inner and outer caliper halves 18A and 18B are joined together with tie bolts 24 extending in the disk axis direction, thereby constituting the caliper body 14.

The caliper body 14 is secured to a part of the vehicle body, more specifically, a support member 29 of a front fork 28 of a motorcycle, with mounting bolts 27 (shown in FIG. 1) passed through two mounting holes 26 formed in the outer caliper half 18B. In this mounted state, the pairs of projecting portions 20A and 20B, 21A and 21B, and 22A and 22B are disposed to extend over the radially outer side of the disk portion 16, as shown in FIG. 2. Thus, the projecting portions 20A and 20B constitute a disk pass portion 20 extending over the disk portion 16 at the radially outer side thereof. Similarly, the projecting portions 21A and 21B constitute a disk pass portion 21 extending over the disk portion 16 at the radially outer side thereof, and the projecting portions 22A and 22B constitute a disk pass portion 22 extending over the disk portion 16 at the radially outer side thereof. The three disk pass portions 20 to 22 are spaced in the disk rotational direction.

Figure 3:
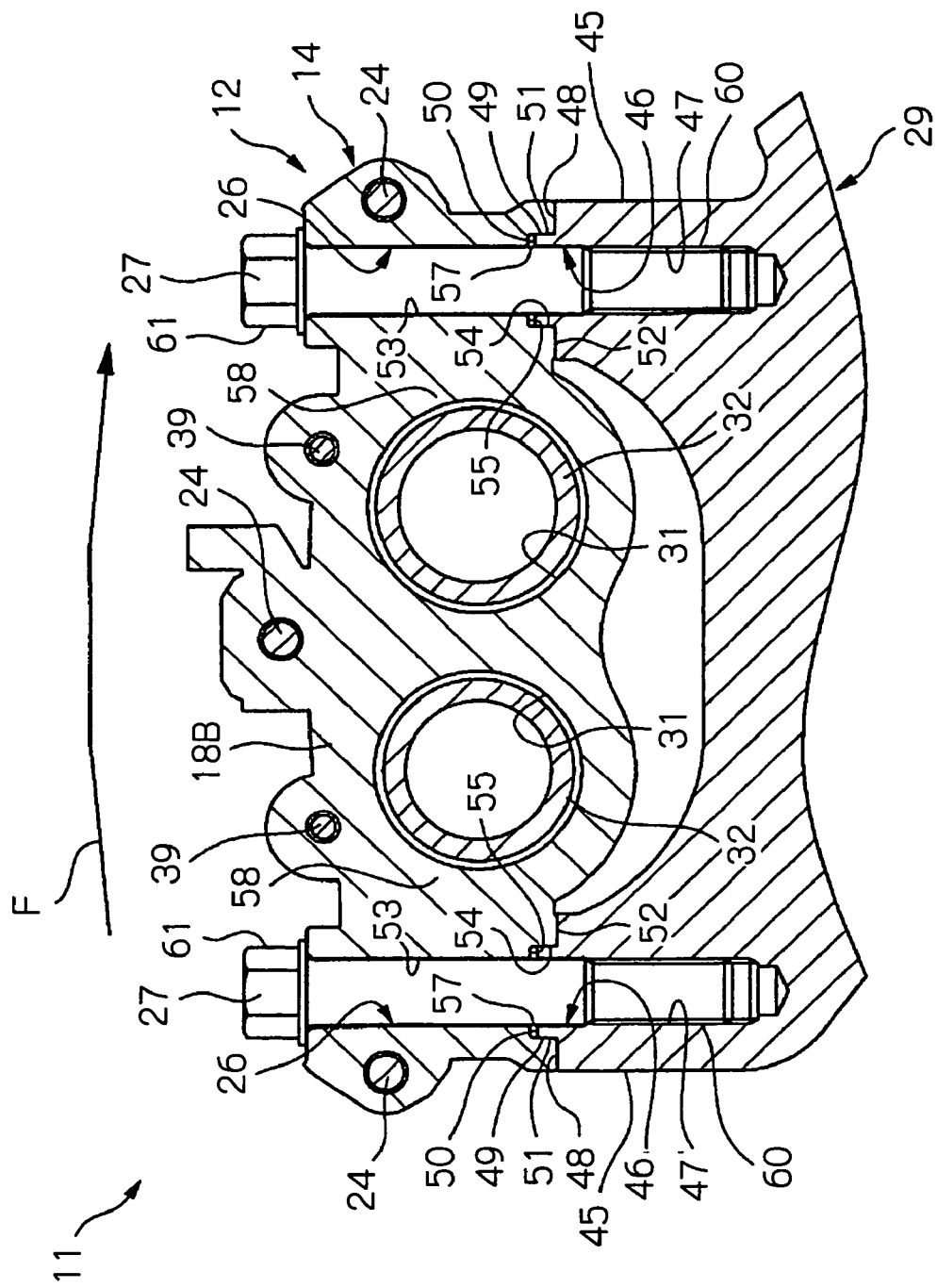
FIG. 3 is a sectional view taken along the line X-X in FIG. 2, showing a caliper of the radially mounted disk brake according to one embodiment of the present invention.

The inner caliper half 18A and the outer caliper half 18B each have two cylinder bores 31 spaced parallel to each other in the disk rotational direction, as shown in FIG. 3. The caliper 12 has pistons 32 each in the shape of a cylinder, one end of which is closed. The pistons 32 are slidably fitted in the bores 31, respectively. Regarding the cylinder bores 31 and the pistons 32, only those provided in the outer caliper half 18B are shown in FIG. 3 because it is a sectional view. The cylinder bores 31 of the inner caliper half 18A and those of the outer caliper half 18B are positioned to face each other. Accordingly, the caliper 12 in this embodiment is a 4-opposed piston type caliper having two pairs of pistons 32 facing each other across the disk portion 16.

The cylinder bores 31 are supplied with a brake fluid from a brake fluid supply port 34 (shown in FIG. 2) formed in the outer caliper half 18B. In response to the supply of the brake fluid, the two pairs of pistons 32 project synchronously. Reference numeral 35 denotes a bleeder mounting portion for fitting a bleeder for air removal.

The inner caliper half 18A and the outer caliper half 18B each have two pin bosses 38 projecting in the disk radial direction to face opening portions 37 that are provided between the disk pass portions 20 and 22 and between the disk pass portions 21 and 22, respectively. Each pair of pin bosses 38 that are disposed to face the same opening portion 37 mutually oppose each other. A pad pin 39 is carried between each pair of mutually opposing pin bosses 38 to extend in the disk axial direction. Consequently, one pad pin 39 is carried in each opening portion 37.

Each pad pin 39 slidably supports a pair of friction pads 41 disposed at both sides of the disk portion 16 in the disk axial direction. The friction pads 41 are suspended from the associated pad pin 39 extending therethrough. The two pairs of friction pads 41, which are supported by the two pad pins 39, are pressed by the two pairs of pistons 32 provided in the cylinder bores 31 of the caliper body 14. Thus, the friction pads 41 come in contact with the disk portion 16 of the disk rotor 15 to press against the disk portion 16, thereby generating braking force. In FIG. 2, reference numeral 42 denotes cover springs that press the friction pads 41 toward the caliper body 14.

As shown in FIG. 1, the support member 29 of the front fork 28 extends radially outward of the disk rotor 15 from a bottom casing 43 of the front fork 28. A plurality (specifically, two) of supporting base portions 45 are formed on the outer end of the support member 29 in the disk radial direction. The supporting base portions 45 are spaced in the disk rotational direction.

As shown in FIG. 3, the supporting base portions 45 have respective threaded holes 46 formed therein to a predetermined depth. The threaded holes 46 extend parallel to each other in the disk radial direction (i.e. a direction perpendicular to the disk axis) and open outward in the disk radial direction. Each threaded hole 46 has an internal thread 47 formed over a predetermined range on an intermediate portion in the axial direction thereof.

Further, each supporting base portion 45 has a bearing surface 48 around the peripheral edge of the threaded hole 46 at the distal end thereof in the disk radial direction. The bearing surfaces 48 of the two supporting base portions 45 extend perpendicularly to the threaded holes 46 and are flush with each other.

Further, each supporting base portion 45 has a cylindrical step portion 49 formed on the distal end thereof in the disk radial direction. The cylindrical step portion 49 is provided closer to the center of the supporting base portion 45, i.e. the threaded hole 46, than the bearing surface 48 and projects outward in the disk radial direction beyond the bearing surface 48. The cylindrical step portion 49 projects perpendicularly to the bearing surface 48. The distal end surfaces 50 of the cylindrical step portions 49 of the two supporting base portions 45 extend perpendicularly to the threaded holes 46 and are flush with each other. The side wall surface 51 of each cylindrical step portion 49 is in coaxial relation to the associated threaded hole 46.

The caliper body 14 is mounted on the support member 29 arranged as stated above. The outer caliper half 18B of the caliper body 14 has the above-described two mounting holes 26 extending in the disk radial direction (i.e. a direction perpendicular to the disk axis). The mounting holes 26 are spaced in the disk rotational direction at the same pitch as that of the threaded holes 46. Thus, the mounting holes 26 are formed at respective positions spaced in the disk rotational direction with the cylinder bores 31 interposed therebetween. Moreover, the mounting holes 26 are positioned inward of the tie bolts 24 at both ends in the disk rotational direction.

Further, the outer caliper half 18B of the caliper body 14 has abutting surfaces 52 formed around the respective peripheral edges of the mounting holes 26 on the side thereof closer to the support member 29. The abutting surfaces 52 extend perpendicularly to the mounting holes 26 and are flush with each other.

Each mounting hole 26 includes a small-diameter hole portion 53 and a large-diameter hole portion 54, which are in coaxial relation to each other. The large-diameter hole portion 54 is formed at the opening of the mounting hole 26 on the side thereof closer to the support member 29, i.e. at the opening on the abutting surface 52. The bottoms 55 of the large-diameter hole portions 54 of the two mounting holes 26 extend perpendicularly to the mounting holes 26 and are flush with each other.

The side wall surface 51 of the cylindrical step portion 49 formed on each supporting base portion 45 of the support member 29 is fitted into the large-diameter hole portion 54 of the associated mounting hole 26 until the abutting surface 52 abuts on the bearing surface 48 of the supporting base portion 45, thereby joining the caliper body 14, i.e. the caliper 12, to the support member 29. In this state, the mounting bolts 27 are inserted into the respective mounting holes 26 of the caliper body 14 from the side thereof remote from the support member 29, and the external threads 60 of the mounting bolts 27 are engaged with the internal threads 47 of the threaded holes 46 of the support member 29. Then, the heads 61 of the mounting bolts 27 are turned to tighten the bolts 27, thereby securing the caliper body 14, i.e. the caliper 12, to the support member 29 on the vehicle body.

The depth of the large-diameter hole portion 54, i.e. the distance between the bottom 55 and the abutting surface 52, is set greater than the height of the cylindrical step portion 49, i.e. the distance between the distal end surface 50 and the bearing surface 48. As a result, when the caliper body 14 is secured to the support member 29 on the vehicle body, a gap 57 is formed between the bottom 55 of the large-diameter hole portion 54 and the distal end surface 50 of the cylindrical step portion 49.

Figure 4:
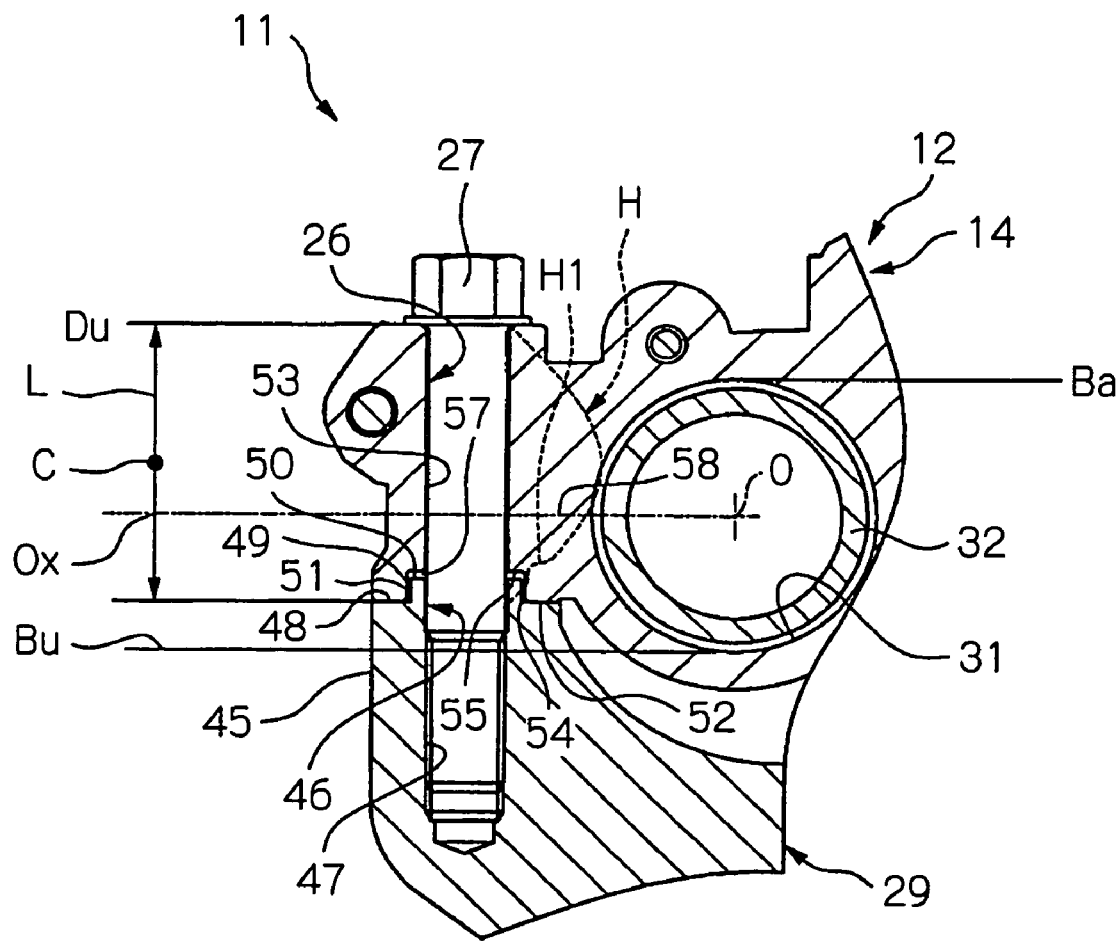
FIG. 4 is a fragmentary sectional view of the caliper of the radially mounted disk brake according to one embodiment of the present invention, showing the size relationship between various portions of the caliper.

In FIG. 4, the distance between the center O of the cylinder bore 31 of the caliper body 14 and the mounting hole 26 is shortest at a portion 58. That is, the portion 58 connects the mounting hole 26 and a portion of the cylinder bore 31 closest to the mounting hole 26 at the shortest distance. As shown in FIG. 4, the center C of the axial length L of the mounting hole 26 is positioned radially outward of the disk rotor 15 in the axial direction of the mounting hole 26 with respect to the shortest-distance portion 58 (the position of the shortest-distance portion 58 in the axial direction of the mounting hole 26 is shown by Ox). Further, the abutting surface 52 of the caliper body 14 and the bearing surface 48 of the support member 29 are positioned radially outward of the disk rotor 15 in the axial direction of the mounting hole 26 with respect to the innermost position Bu of the cylinder bore 31 in the disk radial direction. Also, the outermost position Du of the mounting hole 26 in the disk radial direction comes radially outward of the disk rotor with respect to the outermost position Ba of the cylinder bore in the disk radial direction.

With the radially mounted disk brake 11 according to the foregoing embodiment, the large-diameter hole portions 54 formed at the support member-side openings of the mounting holes 26 of the caliper body 14 are fitted with the side wall surfaces 51 of the cylindrical step portions 49 provided on the support member 29, thereby restricting the movement of the caliper body 14, i.e. the caliper 12, during braking. Therefore, it is possible to minimize brake judder due to the movement of the caliper 12 relative to the support member 29 even if the tightening torque applied to the mounting bolts 27 is reduced to a relatively small value. Accordingly, the deformation of the cylinder bores 31 is minimized, and favorable sliding performance of the pistons 32 can be obtained. Thus, brake feeling improves.

Moreover, the large-diameter hole portions 54 have gaps 57 between their bottoms and the distal end surfaces 50 of the cylindrical step portions 49. Therefore, the deformation of the caliper body 14 toward the cylinder bores 31 due to the tightening torque applied to the mounting bolts 27 can be absorbed by the gaps 57. That is, the magnitude of the deformation may be schematically shown as indicated by the broken line H in FIG. 4. The deformation is absorbed by the presence of each gap 57 as shown by H1 in the broken line H. As a result, the deformation of the cylinder bores 31 is further minimized. Accordingly, favorable sliding performance of the pistons 32 can be surely obtained. Thus, brake feeling improves surely.

In addition, the center C of the axial length L of each mounting hole 26 of the caliper body 14, at which the outward deformation due to the tightening torque reaches a maximum, is displaced radially outward of the disk rotor 15 in the axial direction of the mounting hole 26 with respect to the thin-walled shortest-distance portion 58 of the caliper body 14, at which the distance between the center of the cylinder bore 31 and the mounting hole 26 is shortest. Consequently, the influence of the deformation of the caliper body 14 toward the cylinder bore 31 due to the tightening torque is reduced. As a result, the deformation of the cylinder bore 31 is further minimized, and favorable sliding performance of the piston 32 can be obtained even more surely. Accordingly, brake feeling improves even more surely.

What is claimed is:
1. A radially mounted disk brake comprising a caliper body adapted to be secured to a support member on a vehicle body, said caliper body comprising:
    a cylinder bore for receiving a piston that presses a friction pad against a disk rotor;

a plurality of mounting holes spaced in a rotational direction of the disk rotor with said cylinder bore interposed therebetween and extending in a direction perpendicular to an axis of rotation of the disk rotor so that the caliper body is secured to said support member on the vehicle body with mounting bolts passed through said mounting holes;

large-diameter hole portions formed at respective openings of said mounting holes on a side of the caliper body closer to said support member, and abutting surfaces provided around respective peripheral edges of said large-diameter hole portions of the mounting holes and adapted to abut against said support member on the vehicle body, wherein, cylindrical step portions are formed on said support member to protrude toward the caliper body from associated bearing surfaces of the support member, said large-diameter hole portions receiving said cylindrical step portions of said support member in such a manner that gaps are formed between bottoms of said large-diameter hole portions and distal end surfaces of said cylindrical step portions when the caliper body and the support member rejoined to each other with said mounting bolts, and the gaps are positioned outward of an innermost portion of said cylinder bore with respect to a radial direction of the disk rotor, wherein, along an axis of each of said mounting holes, the position of said abutting surface of said caliper body and the associated bearing surface of said support member is located outward of an innermost portion of said cylinder bore with respect to a radial direction of the disk rotor.

2. A radially mounted disk brake according to claim 1, wherein an outermost portion of each of said mounting holes are positioned outward of an outermost portion of said cylinder bore with respect to a radial direction of the disk rotor.

3. A radially mounted disk brake according to claim 2, wherein said caliper body comprises an outer caliper body portion and an inner caliper body portion disposed on opposite sides of the disk rotor so that the outer caliper body portion has said cylinder bore receiving said piston and the inner caliper body portion has a cylinder bore receiving another piston tat is hydraulically actuated, upon supply of fluid, to press another friction pad against the disk rotor, said pistons in said cylinder bores of the outer and inner caliper body portions being adapted to press the associated friction pads synchronously against the disk rotor.

4. A radially mounted disk brake according to claim 1, wherein said caliper body comprises an outer caliper body portion and an inner caliper body portion disposed on opposite sides of the disk rotor so that the outer caliper body portion has said cylinder bore receiving said piston and the inner caliper body portion has a cylinder bore receiving another piston that is hydraulically actuated, upon supply of fluid, to press another friction pad against the disk rotor, said pistons in said cylinder bores of the outer and inner caliper body portions being adapted to press the associated friction pads synchronously against the disk rotor.

5. A radially mounted disk brake comprising a caliper body adapted to be secured to a support member on a vehicle body, said caliper body comprising:

a cylinder bore for receiving a piston that is hydraulically actuated, upon supply of fluid, to press a friction pad against a disk rotor;

a plurality of mounting holes spaced in a rotational direction of the disk rotor with said cylinder bore interposed therebetween and extending in a direction perpendicular to an axis of rotation of the disk rotor so that the caliper body is secured to said support member ante vehicle body with mounting bolts passed through said mounting holes;

large-diameter hole portions formed at respective openings of said mounting holes on a side of the caliper body closer to said support member, and abutting surfaces provided around respective peripheral edges of said mounting holes and adapted to abut against said support member on the vehicle body, wherein, a center of the axial length of each of said mounting holes is positioned outward in a radial direction of the disk rotor along an axis of said mounting hole with respect to a shortest-distance portion of said caliper body at which a distance between a center of said cylinder bore and said mounting hole is shortest, and in an area where said caliper body and said support member are joined together, cylindrical step portions are formed on said support member so as to protrude toward the caliper body, wherein gaps are formed between bottoms of said large-diameter hole portions and distal end surfaces of said cylindrical step portions when said caliper body and said support member are joined to each other with said mounting bolts, and the gaps are positioned outward of an innermost portion of said cylinder bore with respect to a radial direction of the disk rotor, wherein, along an axis of each of said mounting holes, the position of said abutting surface of said caliper body and the associated bearing surface of said support member is located outward of an innermost portion of said cylinder bore with respect to a radial direction of the disk rotor.

6. A radially mounted disk brake according to claim 5, wherein, outermost portions of said mounting holes are positioned outward of an outermost portion of said cylinder bore with respect to a radial direction of the disk rotor.

7. A radially mounted disk brake according to claim 5, wherein said caliper body comprises an outer caliper body portion and an inner caliper body portion disposed on the opposite sides of said disk rotor so that the outer caliper body portion has said cylinder bore receiving said piston and the inner caliper body portion has a cylinder bore receiving another piston that is hydraulically actuated, upon supply of fluid, to press another friction pad against the disk rotor, said pistons in said cylinder bores of the outer and inner caliper body portions being adapted to press the associated friction pads synchronously against the disk rotor.

8. A radially mounted disk brake comprising a caliper body adapted to be secured to a support member on a vehicle body, said caliper body comprising;

a cylinder bore for receiving a piston that presses a friction pad against a disk rotor;

a plurality of mounting holes spaced in a rotational direction of the disk rotor with said cylinder bore interposed therebetween and extending in a direction perpendicular to an axis of rotation of the disk rotor so that the caliper body is secured to said support member on the vehicle body with mounting bolts passed through said mounting holes; and abutting surfaces provided around respective peripheral edges of said mounting holes and adapted to abut against said support member on the vehicle body, wherein, along an axis of each mounting hole, the position of said abutting surface of the caliper body and the associated bearing surface of the support member is located outward of an innermost portion of said cylinder bore with respect to a radial direction of the disk rotor, and wherein, in an area where said caliper body and support member are joined together, cylindrical step portions are formed on said support member so as to protrude toward the caliper body and large-diameter hole portions are formed in said caliper body at respective openings of said mounting holes on a side of the caliper body that is closer to said support member for receiving said cylindrical step portions of said support member in such a manner that gaps are formed between bottoms of said large-diameter hole portions and distal end surfaces of said cylindrical step portions when said caliper body and said support member rejoined to each other with said mounting bolts, wherein outermost portions of said mounting holes are positioned outward of an outermost portion of said cylinder bore with respect to a radial direction of the disk rotor.

9. A radially mounted disk brake according to claim 8, wherein said caliper body comprises an outer caliper body portion and an inner caliper body portion disposed on opposite sides of the disk rotor so that the outer caliper body portion has said cylinder bore receiving said piston and the inner caliper body portion has a cylinder bore receiving another piston that is hydraulically actuated, upon supply of fluid, to press another friction pad against the disk rotor, said pistons in said cylinder bores of the outer and inner caliper body portions being adapted to press the associated friction pads synchronously against the disk rotor.

10. A radially mounted disk brake comprising a caliper body adapted to be secured to a support member on a vehicle body, said caliper body comprising:

a cylinder bore for receiving a piston that is hydraulically actuated upon supply of fluid to press a friction pad against a disk rotor;

a plurality of mounting holes spaced in a rotational direction of the disk rotor wit said cylinder bore interposed therebetween and extending in a direction perpendicular to an axis of rotation of the disk rotor so that the caliper body is secured to said support member on the vehicle body with mounting bolts passed through said mounting holes; and abutting surfaces provided around respective peripheral edges of said mounting holes and adapted to abut against said support member on the vehicle body, wherein, outermost portions of said mounting holes are positioned outward of an outermost portion of said cylinder bore with respect to a radial direction of the disk rotor, along an axis of each mounting hole, the position of said abutting surface of the caliper body and the associated bearing surface of the support member is located outward of an innermost portion of said cylinder bore with respect to a radial direction of the disk rotor, and thereby a center of the axial length of each of said mounting holes is positioned outward in a radial direction of the disk rotor along an axis of said mounting hole with respect to a shortest-distance portion of said caliper body at which a distance between a center of said cylinder bore and said mounting hole is shortest, wherein said caliper body comprises an outer caliper body portion and an inner caliper body portion disposed on opposite sides of the disk rotor, so that the outer caliper body portion has said cylinder bore receiving said piston and the inner caliper body portion has a cylinder bore receiving another piston that is hydraulically actuated, upon supply of fluid, to press another friction pad against the disk rotor, said pistons in said cylinder bores of the outer and inner caliper body portions being adapted to press the associated friction pads synchronously against the disk rotor, wherein, in an area where said caliper body and said support member are joined together, cylindrical step portions are formed on said support member so as to protrude toward said caliper body, and large-diameter hole portions are formed in said caliper body at respective openings of said mounting holes on a side of said caliper body closer to said support member for receiving said cylindrical step portions of said support member in such a manner that gaps are formed between bottoms of said large-diameter hole portions and distal end surfaces of said cylindrical step portions when said caliper body and said support member are joined to each other with said mounting bolts.

11. A radially mounted disk brake according to claim 10, wherein said gaps are positioned outward of an innermost portion of said cylinder bore with respect to a radial direction of the disk rotor.

* * * * *